April 28, 1953     W. SWENSON     2,636,304

TRANSLUCENT COVER FOR COLORED FISHING LURES

Filed May 20, 1948

INVENTOR
WYMAN SWENSON
BY Howard T. Jeandron
ATTORNEY

Patented Apr. 28, 1953

2,636,304

UNITED STATES PATENT OFFICE 2,636,304

TRANSLUCENT COVER FOR COLORED FISHING LURES

Wyman Swenson, White Plains, N. Y.

Application May 20, 1948, Serial No. 28,240

1 Claim. (Cl. 43—42.24)

This invention relates to a fishing lure and more particularly to a plurality of brightly colored beads having a translucent rubber covering to simulate a worm.

It is old in the art to use brightly colored beads as a means of attracting the attention of the fish. It is also old to use glass bead reflectors, other means such as luminous paint have been used and an artificial minnow with an electric light. The flashy colored beads may be a means of attracting the attention of the fish but apparently they do not simulate the real bait, with the exception of red beads, however, which may, in certain waters, simulate salmon eggs.

Applicant in addition to utilizing a brilliant color such as a red for the bead, has compiled a plurality of beads and covered them with a translucent rubber covering, the effect being to simulate a blood worm. This type of lure is quite natural in its effect and in addition, it is a durable type of lure that will stand a great deal of abuse without damage to the line or lure itself.

An object of this invention is to provide a fishing lure that simulates a blood worm.

A further object of this invention is to provide an easily constructed fishing lure that is natural in appearance and is strong and durable in use.

A further object of this invention is to provide a fishing lure comprised of brilliantly colored beads that are covered by a translucent covering to retain said beads in an adjacent abutting formation and still permit a great deal of flexible movement similar to that of a natural worm.

Other objects of this invention may be apparent by reference to the accompanying description and the drawing in which.

Figure 1:
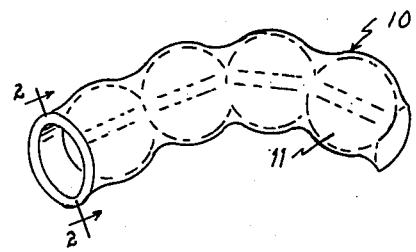
Fig. 1 illustrates the lure according to this invention.
Figure 2:
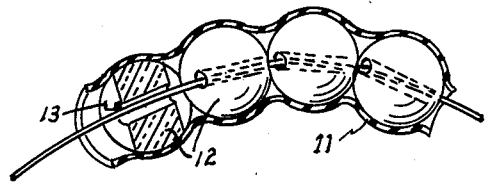
Fig. 2 illustrates a cross sectional view taken on line 2—2 of Fig. 1.

Referring to Figs. 1 and 2, there is illustrated a fishing lure 10 comprised of a flexible translucent covering membrane 11. This membrane 11 may be of rubber or a synthetic material providing the flexibility and translucent quality. The lure 10 in addition is provided with a plurality of beads 12 (Fig. 2). The beads 12 are inserted within the covering membrane 11 as illustrated in Fig. 2 and being in their customary form there is an aperture 13 provided in each bead. These apertures 13 are necessarily aligned to permit passing the fishing line directly through the apertures 13, thus the complete unit 10 can be moved adjacent to the fish hook in use. In some instances, the shank of the hook, where the shank is quite long, may be passed through the apertures 13 instead of the line, at any rate the lure 10 must be strung on the line or shank in a position adjacent to the hook so that when the fish attacks the lure, the hooks are in a proper position to be caught in the mouth of the fish. It is readily apparent, that when the lure 10 has been mounted on the fishing line, due to its structure, it is quite flexible and permits bending or movement that would simulate the effects of a blood worm. Further by utilizing red beads 12, the appearance of the red beads through the translucent membrane 11 is truely the appearance of blood and such probably would attract fish more than a shiny or brilliantly colored reflector that does not represent or suggest the blood of a blood worm.

Various changes and modifications may be made to this device without departing from the spirit of this invention and this invention shall be limited only by the appended claim.

What is claimed is:

In a fishing lure, a plurality of centrally apertured beads, said beads being oriented so that the apertures are located in an aligned relationship, and a translucent expansible tube constituting initially a tube of a diameter slightly less than the diameter of said beads, said beads being mounted within the translucent tube with adjacent beads in an abutting relationship, said bead apertures adapted to receive a line through the aligned apertures to locate the line along substantially the longitudinal axis of the tube.

WYMAN SWENSON.

References Cited in the file of this patent

UNITED STATES PATENTS

| Number | Name | Date |
|---|---|---|
| 825,232 | Mitchell | July 3, 1906 |
| 1,561,512 | Fredricks | Nov. 17, 1925 |
| 1,714,158 | Colledanchise | May 21, 1929 |
| 1,822,785 | Petrie | Sept. 8, 1931 |
| 1,841,375 | Meyer | Jan. 19, 1932 |
| 2,092,304 | Eger | Sept. 7, 1937 |
| 2,102,739 | Peters | Dec. 21, 1937 |
| 2,206,274 | Wiberg | July 2, 1940 |
| 2,241,941 | Bates | May 13, 1941 |
| 2,551,221 | Pray | May 1, 1951 |